United States Patent
Loesch et al.

(10) Patent No.: US 11,131,749 B2
(45) Date of Patent: Sep. 28, 2021

(54) MIMO RADAR SENSOR FOR MOTOR VEHICLES

(71) Applicant: Robert Bosch GmbH, Stuttgart (DE)

(72) Inventors: Benedikt Loesch, Stuttgart (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 277 days.

(21) Appl. No.: 16/469,506

(22) PCT Filed: Oct. 19, 2017

(86) PCT No.: PCT/EP2017/076680
§ 371 (c)(1),
(2) Date: Jun. 13, 2019

(87) PCT Pub. No.: WO2018/108359
PCT Pub. Date: Jun. 21, 2018

(65) Prior Publication Data
US 2019/0391230 A1    Dec. 26, 2019

(30) Foreign Application Priority Data
Dec. 14, 2016    (DE) .......................... 102016224900.2

(51) Int. Cl.
*G01S 7/03*    (2006.01)
*G01S 13/00*    (2006.01)
(Continued)

(52) U.S. Cl.
CPC ............ *G01S 7/032* (2013.01); *G01S 13/003* (2013.01); *G01S 13/42* (2013.01); *G01S 13/931* (2013.01);
(Continued)

(58) Field of Classification Search
CPC .......... G01S 7/032; G01S 7/352; G01S 13/32; G01S 13/42; G01S 13/931; H01Q 1/32;
(Continued)

(56) References Cited

U.S. PATENT DOCUMENTS 5,497,161 A * 3/1996 Tsui ........................ G01S 3/043
324/76.19
6,246,365 B1 * 6/2001 Tokoro .................... G01S 13/42
342/149

(Continued)

FOREIGN PATENT DOCUMENTS

DE    102014219113 A1    3/2016
JP    H11287857 A    10/1999
(Continued)

OTHER PUBLICATIONS

International Search Report for PCT/EP2017/076680, dated Feb. 8, 2018.

*Primary Examiner* — Peter M Bythrow
(74) *Attorney, Agent, or Firm* — Norton Rose Fulbright US LLP; Gerard Messina (57) ABSTRACT

A MIMO radar sensor is described for motor vehicles as including an antenna array, which is angle-resolving in two directions perpendicular to each other and including multiple receiving antennas, which are situated offset from one another in a first of the two directions, and multiple transmitting antennas, and including a control and evaluation unit for activating the transmitting antennas and for evaluating signals of the receiving antennas. The antenna array includes at least three selectively activatable transmitting antennas, which are offset from one another both in the first direction as well as in the second direction, and the control and evaluation unit is designed for a two-dimensional angle estimation in the first direction and the second direction (Continued)

using the signals received when the transmitting antennas are activated differently.

13 Claims, 8 Drawing Sheets

(51) Int. Cl.
    *G01S 13/42*     (2006.01)
    *G01S 13/931*     (2020.01)
    *H01Q 1/32*     (2006.01)
    *H01Q 21/00*     (2006.01)
    *G01S 13/34*     (2006.01)

(52) U.S. Cl.
    CPC ....... *H01Q 1/3233* (2013.01); *H01Q 21/0025* (2013.01); *G01S 13/343* (2013.01); *G01S 13/422* (2013.01)

(58) Field of Classification Search
    CPC ...... H01Q 1/3233; H01Q 21/00; H01Q 21/22; H01Q 21/28
    See application file for complete search history.

(56) References Cited

U.S. PATENT DOCUMENTS

| | | | | |
|---|---|---|---|---|
| 6,288,672 | B1* | 9/2001 | Asano | G01S 7/35 342/368 |
| 6,750,810 | B2* | 6/2004 | Shinoda | H01Q 3/2605 342/149 |
| 8,289,203 | B2* | 10/2012 | Culkin | H01Q 21/061 342/73 |
| 8,436,763 | B2* | 5/2013 | Wintermantel | G01S 7/285 342/70 |
| 8,717,224 | B2* | 5/2014 | Jeong | G01S 13/931 342/70 |
| 9,568,600 | B2* | 2/2017 | Alland | G01S 7/03 |
| 10,168,419 | B2* | 1/2019 | Trummer | H01Q 15/244 |
| 10,401,475 | B2* | 9/2019 | Villeval | G01S 7/35 |
| 10,481,249 | B2* | 11/2019 | Alenljung | G01S 13/42 |
| 2009/0303108 | A1* | 12/2009 | Hilsebecher | G01S 7/352 342/157 |
| 2011/0074620 | A1* | 3/2011 | Wintermantel | H01Q 9/0407 342/70 |
| 2013/0027269 | A1* | 1/2013 | Grime | H01Q 1/521 343/841 |
| 2014/0104097 | A1* | 4/2014 | Binzer | G01S 13/02 342/74 |
| 2014/0306840 | A1* | 10/2014 | Koerber | G01S 7/032 342/107 |
| 2014/0340253 | A1* | 11/2014 | Koerber | G01S 7/032 342/104 |
| 2015/0048970 | A1* | 2/2015 | Schoor | G01S 13/32 342/149 |
| 2015/0204972 | A1* | 7/2015 | Kuehnle | G01S 13/931 342/156 |
| 2015/0212198 | A1* | 7/2015 | Nishio | G01S 7/415 342/385 |
| 2015/0253419 | A1* | 9/2015 | Alland | G01S 13/4463 342/385 |
| 2015/0253420 | A1* | 9/2015 | Alland | G01S 13/4454 342/156 |
| 2015/0260836 | A1* | 9/2015 | Hayakawa | H01Q 13/206 342/70 |
| 2016/0033632 | A1* | 2/2016 | Searcy | G01S 13/4454 342/153 |
| 2016/0131742 | A1* | 5/2016 | Schoor | H01Q 25/00 342/128 |
| 2016/0209504 | A1* | 7/2016 | Steinhauer | G01S 3/44 |
| 2016/0282450 | A1* | 9/2016 | Kishigami | G01S 13/284 |
| 2016/0285172 | A1* | 9/2016 | Kishigami | G01S 13/22 |
| 2017/0082730 | A1* | 3/2017 | Kishigami | H01Q 21/061 |
| 2017/0307744 | A1* | 10/2017 | Loesch | G01S 13/003 |
| 2018/0166794 | A1* | 6/2018 | Raphaeli | G01S 13/347 |
| 2020/0363522 | A1* | 11/2020 | Ishikawa | G01S 13/4454 |

FOREIGN PATENT DOCUMENTS

| | | |
|---|---|---|
| JP | 2017535008 A | 11/2017 |
| WO | 2013034261 A1 | 3/2013 |

* cited by examiner

MIMO RADAR SENSOR FOR MOTOR VEHICLES

FIELD OF THE INVENTION

The present invention relates to a MIMO radar sensor for motor vehicles, including an antenna array, which is angle-resolving in two directions perpendicular to each other, and multiple receiving antennas arranged offset to one another in a first of the two directions, as well as multiple transmitting antennas, and a control and evaluation unit for activating the transmitting antennas and for evaluating the signals of the receiving antennas.

BACKGROUND INFORMATION

Radar sensors are employed in driver assistance systems or in autonomous vehicle guidance systems for motor vehicles for monitoring surroundings, in particular, for measuring distances, relative speeds and direction angles of other vehicles and also of stationary objects. In addition to detecting the azimuth angle of an object, i.e., the angle between the forward direction of the vehicle and the line of sight to the object in a horizontal plane, it is often also necessary to detect the elevation angle, i.e., the angle between the line of sight to the object and the horizontal plane. The elevation angle, for example, allows a conclusion to be drawn about the relevance of the target, i.e., about whether the target may be driven over or driven under (for example, a bridge) or whether it is a real obstacle. Azimuth angles and elevation angles of the targets may be ascertained based on amplitudes and or on phase differences between multiple transmitting antennas and/or receiving antennas of an antenna array. The use of multiple transmitting antennas and multiple receiving antennas is referred to as a "Multiple-Input-Multiple-Output (MIMO) system. This results in a (virtual) enlarged antenna aperture and, therefore, in an improved angular accuracy and angular separation capability.

A MIMO radar sensor of the aforementioned type is described in U.S. Pat. No. 8,436,763 which, in addition to determining the azimuth angle, also offers a possibility of determining the elevation angle of the objects. In this case, the receiving antennas are situated horizontally in the form of a uniform array with periodically varying vertical offsets. Due to the offsets of the receiving antennas in the horizontal (first) direction, the phases of the received signals vary periodically from antenna to antenna at a particular spatial frequency, which is a function of the azimuth angle. As a result of the additional vertical offset of the receiving antennas, the spatial frequency of the azimuth angle is superimposed by a second spatial frequency, which is a function of the elevation angle. The two frequencies may be separated from one another with the aid of a spatial Fourier Transform (Fast Fourier Transform; FFT). This may, however, result in ambiguities between azimuth angles and elevation angles if multiple targets are present in a similar distance at a similar relative speed (in the same distance relative speed bin). This may occur, in particular, during multipath propagation of the radar signal, for example, during reflections of the signal on the roadway surface, on guardrails or on tunnel walls.

To estimate an azimuth angle, it is necessary to evaluate the signals received by the individual receiving antennas in separate evaluation channels. In order to improve the angle accuracy and the angular separation capability in the azimuth with a given number of evaluation channels, distances between the individual antennas are frequently selected, which are greater than the half wavelength λ/2 of the radar waves. This may also result in ambiguities, which have to be resolved either with the aid of a separate antenna array or with the aid of other methods, for example, by tracking the located targets over a longer period of time.

The frequency of the transmitted radar signal in conventional FMCW radar sensors is ramp-shaped modulated. The received signal is mixed with a portion of the signal transmitted at the receive point in time, so that an intermediate frequency signal is obtained, the frequency of which corresponds to the frequency difference between the transmitted signal and the received signal. This frequency difference is also a function of the relative speed of the object due to the frequency modulation of the signal propagation time and due to the Doppler effect, so that information about the distance and the relative speed of the object is obtained in multiple measuring cycles, in which ramps having different slopes are navigated. The intermediate frequency signal recorded during a measuring cycle is converted into a spectrum by a fast Fourier transform (FFT), in which each located object is marked by a peak in a particular frequency bin. Under certain conditions, however, the peaks originating from various objects may overlap, so that only one peak having a somewhat greater width (and, accordingly, a lower quality value) appears in the spectrum. Multiple target estimation methods are known, in which additional information about the width and shape (the quality) of the peak is obtained by using a larger number of measurements, and then based on this information individual targets and multiple targets having overlapping peaks may be differentiated and, if necessary, the distances, relative speeds and angles of the individual targets whose peaks overlap one another may also be determined. If a particular number N of multiple targets is to be resolved, then generally N+2 independent measurements are needed for such purpose. N+2 independent measurements carried out with different antenna configurations are needed to resolve N multiple targets at an angle.

The angle is estimated by exploiting the fact that the amplitude relationships and phase relationships of the signals received by the various receiving antennas is a characteristic function of the angle of the object. So-called DML functions (deterministic maximum likelihood functions), for example, are formed, which indicate how strongly the amplitude relationships and phase relationships actually measured for the object correlate with the theoretical amplitude relationships and phase relationships for different angle hypotheses. The angle hypothesis in which the correlation is greatest then represents the best estimation value for the angle of the object. For uniform arrays, there are computationally efficient methods such as a FFT or the so-called matrix-pencil method.

SUMMARY

The object of the present invention is to create a radar sensor which, with a given number of evaluation channels, ensures an improved accuracy in the estimation of the azimuth angles and elevation angles of objects.

This object is achieved according to the present invention in that the antenna array includes at least three selectively activatable transmitting antennas, which are situated offset to one another in both the first direction as well as in the second direction, and the control and evaluation unit is designed for a two-dimensional angle evaluation in the first and second direction using the signals received when the transmitting antennas are activated differently.

The fact that the at least three transmitting antennas are situated offset from one another not only in the first direction, but also in the second direction, allows the improved accuracy and separation capability enabled by the MIMO principle to be utilized not only in measuring the azimuth angles, but also in measuring the elevation angles. The determination of the elevation angle in this case is based on at least three independent measurements, in which a different one of the transmitting antenna is activated in each case. In this way, it is possible to also determine a quality value for the elevation angle, which gives at least indications of a potential multiple target scenario. Since the three transmitting antennas are also offset in the first direction, an improvement of the aperture in the horizontal and, therefore, an improvement in the angular separation capability and/or a resolution of ambiguities in the azimuth angle measurement is enabled, without the need for additional evaluation channels.

In one advantageous specific embodiment, the antenna array includes at least four transmitting antennas, which are offset from one another in the second (vertical) direction. A multiple target estimation in elevation is also enabled as a result. Due to this multiple target estimation, it is also possible, in particular, to more clearly recognize scenarios with multipath propagation of the radar signal, for example, with reflection of the signal on the roadway surface, as a result of which a higher measuring accuracy is achieved and an accurate interpretation of the measuring results is facilitated.

In one advantageous specific embodiment, the receiving antennas are situated at distances that are greater than $\lambda/2$. The horizontal arrangement of the transmitting antennas may then be selected in such a way that a virtual aperture is obtained, which fills the gaps in the real aperture and thus reduces the probability of ambiguities or eliminates the ambiguities entirely.

The receiving antennas may optionally also form at least two arrays, which are offset from one another in the second (the vertical) direction so that a higher accuracy in the elevation angle measurement may be achieved by the enlarged virtual aperture.

DETAILED DESCRIPTION

Figure 1:
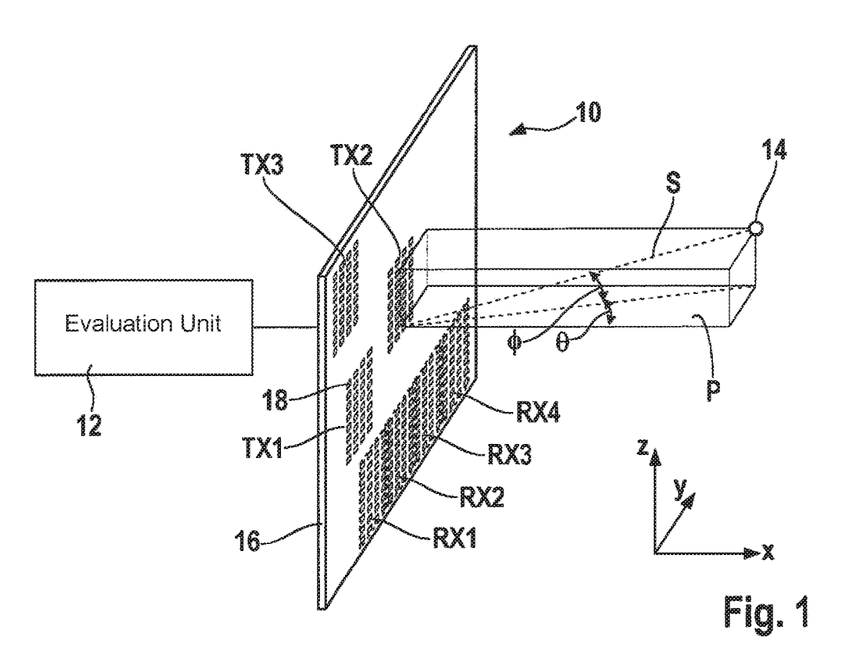
FIG. 1 schematically shows a representation of an antenna array of a radar sensor and of an object to be located with the aid of this antenna array.

FIG. 1 shows an antenna array 10 and a control and evaluation unit 12 of a radar sensor, which is used to measure distances, relative speeds as well as direction angles of objects. A single object 14 is shown here as an example. The radar sensor is, for example, installed in the front end of a motor vehicle not shown and is used, in particular, to detect preceding vehicles or other objects ahead of the vehicle.

The radar sensor shown here is designed specifically for a two-dimensional angle estimation, in which both azimuth angle $\theta$ as well as elevation angle $\phi$ of object 14 is estimated. Elevation angle $\phi$ in this case is defined as the angle between line of sight S from the center of the radar sensor to object 14 and an azimuthal (horizontal) plane P, which is spanned by a forward direction x of the vehicle and a sideward direction y (first direction y). Azimuth angle $\theta$ is defined as the angle between forward direction x and the vertical projection of line of sight S on azimuthal plane P. The radar sensor is therefore angle-resolving in a first direction y (measurement of the azimuth angle) and in a second direction z (measurement of the elevation angle).

Antenna array 10 in the example shown here includes four receiving antennas RX1 through RX4 and three transmitting antennas TX1 through TX3, which are situated on a shared planar substrate 16. Receiving antennas RX1 through RX4 are situated at uniform distances on a straight line, which extends in first direction y. Thus, the receiving antennas form a so-called ULA (uniform linear array). Transmitting antennas TX1 through TX3 in this example are designed separately from the receiving antennas (bi-static antenna concept) and are situated offset to one another and to the receiving antennas, both in first direction y as well as in second direction z.

Both the transmitting antennas as well as the receiving antennas are each designed as group antennas and in the example shown are made up of an array of 32 antenna elements or patches 18, which are situated in four vertical columns with 8 patches per column. In each of the transmitting antennas, patches 18 are fed with in-phase transmission signals supplied by control and evaluation unit 12. The matrix-like arrangement of patches 18 results in a bundling of the emitted radar radiation. Since the length of the columns (8 patches) in this example is greater than the length of the rows (4 patches), the radar radiation is bundled more strongly in elevation than it is in the azimuth.

The receiving antennas RX1 through RX4 in this example are also made up of patches 18, which are arranged the same as the patches in the transmitting antenna. In each individual receiving antenna, the signals received by individual patches 18 are combined through signal lines not shown to form a single signal, without the phase relationships between the signals being changed by the various patches in the process. Thus, the receiving lobes of the receiving antennas in this example have the same shape as the transmitting lobes of the transmitting antennas.

Object 14, which in practice is significantly further away from antenna array 10 than in the schematic representation in FIG. 1, is within the transceiver lobes of all transceiver antennas, so that a radar signal that is emitted by any one of transmitting antennas TX1 through TX3 and is reflected on object 14 may be received by each of receiving antennas RX1 through RX4.

Figure 2:
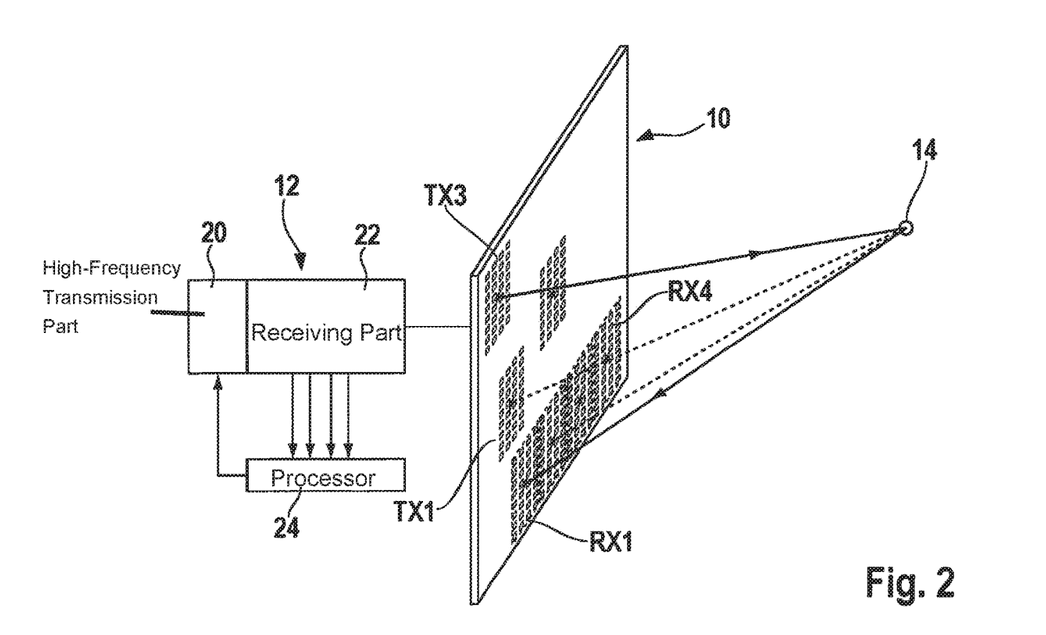
FIG. 2 shows a diagram similar to FIG. 1 for illustrating different signal propagation paths.

As an example, FIG. 2 shows a signal propagation path in solid lines, which leads from transmitting antenna TX3 to object 14 and from there back to receiving antenna RX1, and a signal propagation path from transmitting antenna TX1 via object 14 to receiving antenna RX4 in dashed lines. In simple terms, it may be assumed that the radar signal emanates from a phase center of the transmitting antenna (marked here as a black dot in the middle of the relevant group antenna) and extends to a corresponding phase center of the receiving antenna.

The control and evaluation unit 12 is depicted in FIG. 2 in somewhat greater detail and includes a high-frequency transmission part 20, which generates the transmission signals for the transmitting antennas, as well as a receiving part 22, which receives the signals from receiving antennas RX1 through RX4 in four separate receiving channels, downmixes these into an intermediate frequency band and records and digitizes the thus obtained intermediate frequency signals via a measuring cycle at a particular sample rate. In this way, four digitized received signals are obtained, which are then further evaluated in a processor 24. Processor 24 also controls high-frequency transmission part 20 and determines when which of the three transmitting antennas transmits.

The signal propagation paths, of which only two are shown by way of example in FIG. 2, have a different length for each pairing of transmitting antenna and receiving antenna due to the offset of the transmitting antennas and receiving antennas. Although it may generally be assumed, due to the large distance between antenna array 10 and object 14, that the radar waves are emitted as flat waves and flat waves are also received again, the different lengths of the signal paths result in characteristic differences in the amplitudes and phases of the signals received in the four receiving channels. These differences are a function of the pairing of the transmitting antennas and receiving antennas as well as of the azimuth angle θ and elevation angle φ of object 14. This effect is utilized in the digital evaluation of the data in processor 24 for estimating the azimuth angle and the elevation angle of the object, as is to be described in greater detail below.

Figure 3:
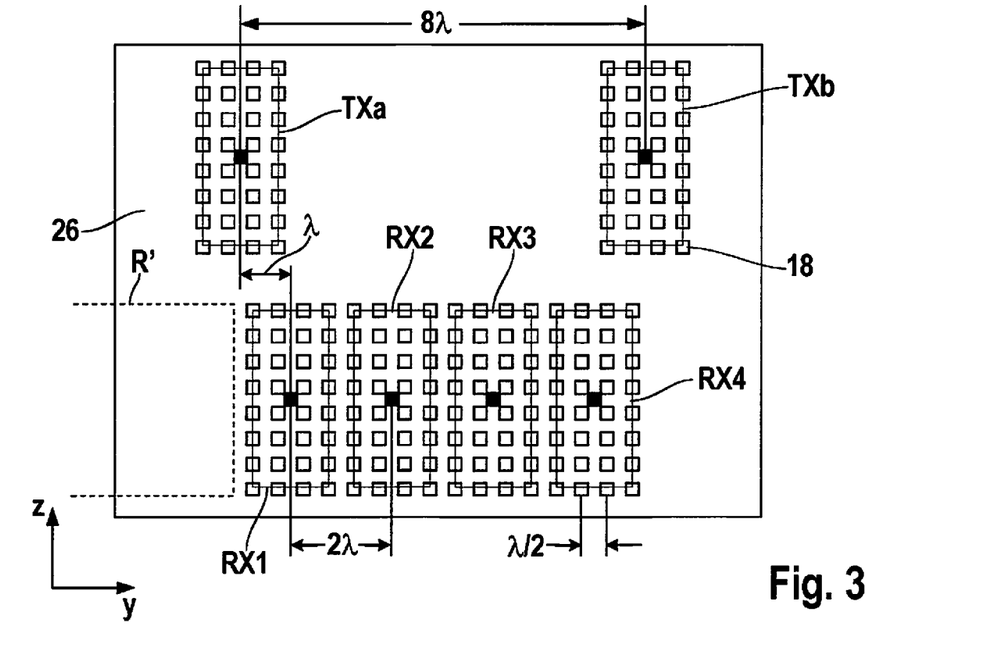
FIG. 3 shows an example of an antenna array angle-resolving only in the azimuth.

FIG. 3 shows a simplified example of an antenna array 26 which, besides the previously described four receiving antennas RX1 through RX4, includes merely two transmitting antennas TX1 and TX2. Transmitting antennas TX1 and TX2 in the second (vertical) direction z are offset from receiving antennas RX1 through RX4. However, the two transmitting antennas are not offset from one another, but are situated at the same height.

Patches 18 of the transmitting antennas and of the receiving antennas are quadratic and have an edge length of λ/4, λ being the (average) wavelength of the emitted radar waves. The distance from patch to patch within each group antenna is λ/2 in both the horizontal as well as in the vertical. The four receiving antennas RX1 through RX4 are situated at distances of 2λ, i.e., the distance between the phase centers of two adjacent receiving antennas is 2λ. Transmitting antenna TX1 is offset outwardly by 1λ, from receiving antenna RX1 in the horizontal. Symmetrically thereto, transmitting antenna TX2 is offset outwardly by 1λ, with respect to receiving antenna RX4.

In a first measuring cycle, transmission occurs only with transmitting antenna TX1. If in the following measuring cycle transmission then occurs only with transmitting antenna TX2, the resulting situation with respect to the wave propagation is equivalent to the case in which transmission occurs with first transmitting antenna TX1, but receiving antennas RX1 through RX4 are offset to the left by 8λ, as is indicated in FIG. 3 by a dashed line R'. While the real receiving array formed by receiving antennas RX1 through RX4 has an aperture of 6λ, the result therefore is a virtual receiving array with double the aperture 12λ resulting from the alternating use of transmitting antennas TX1 and TX2, so that more concise phase differences and amplitude differences result and a sharper angle separation is thus enabled.

Figure 4:
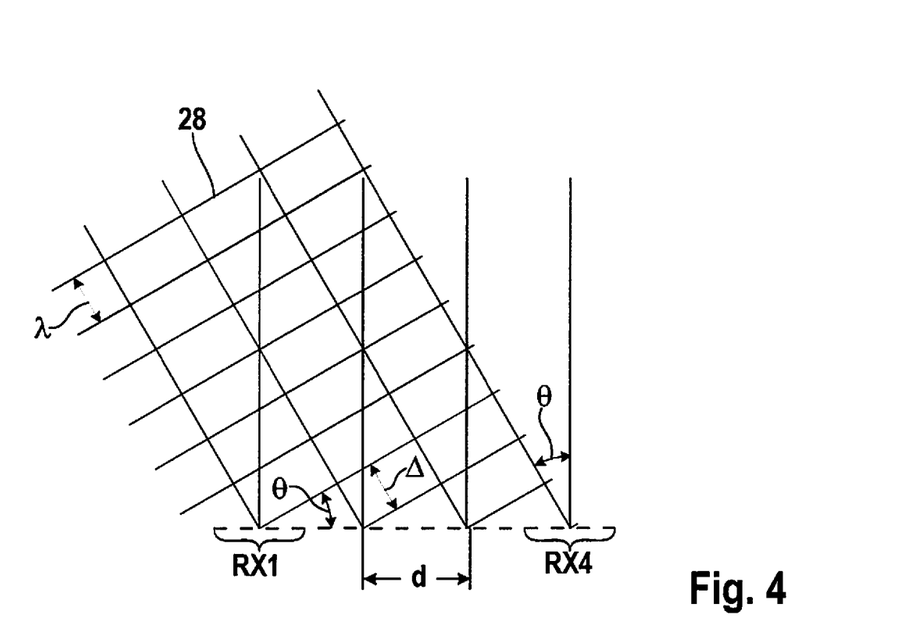
FIG. 4 shows a diagram for explaining the angle dependency of the phase of transmitted and/or received radar signals.

The connection between the azimuth angle θ and the phases of the signals received in the four receiving channels is explained with reference to FIG. 4. FIG. 4 illustrates specifically the case that (flat) radar waves 28 having a wavelength λ are received from a far off object, which has the azimuth angle θ=30° and the elevation angle φ=0°. It is apparent that radar waves 28 must travel a longer distance to receiving antenna RX4 than to receiving antenna RX1. If d refers to the distance between the phase centers of two adjacent receiving antennas, then the run length difference Δ between the radar signals is given as $$\Delta = \sin\theta,$$

$$\Delta\varphi = (2\pi/\lambda)*d*\sin\theta$$

then applies for the phase difference Δφ.

In the example shown, d=2λ. Thus, with the specific azimuth angle θ=30°, $$\Delta\varphi = (2\pi/\lambda)*2\lambda*\sin 30° = 2\pi = 0 \text{ is obtained.}$$

The last equation 2π=0 results from the fact that the phase is determined only modulo 2π.

In this specific case, therefore, the phase relationship is the same as with the vertical incidence of the radar radiation on the receiving array (no run length differences and therefore no phase differences). An estimation of this azimuth angle carried out with this receiving array is therefore ambiguous, since no distinction may be made between azimuth angles θ=0° and θ=+/−30°.

If measurements are made alternatingly with transmitting antennas TX1 and TX2, then a phase difference resulting from the distance between the two transmitting antennas in the direction y is included when comparing the measurement results. However, since in this case this distance is 8λ, and is thus also a multiple of 2λ, the ambiguity is not eliminated even when the two transmitting antennas are operated alternatingly.

Figure 5:
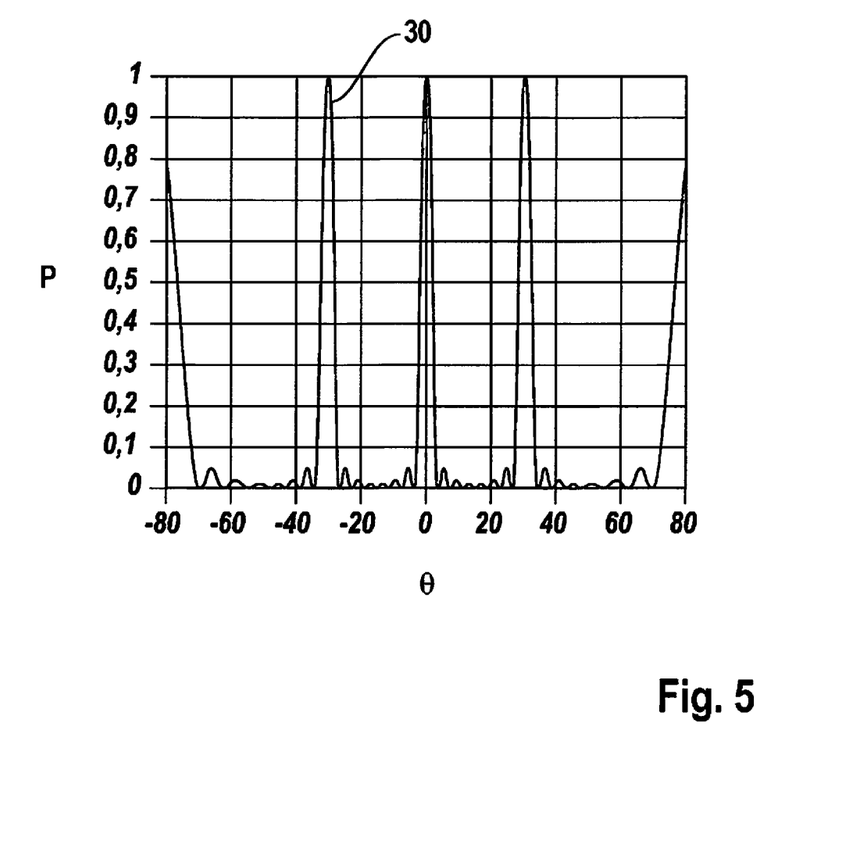
FIG. 5 shows an angle spectrum for the antenna array according to FIG. 3.

This fact is also reflected in the angle spectrum shown in FIG. 5, in which it is indicated by a curve 30 how, for an object that is located at azimuth angle θ, power P received by all receiving antennas combined is a function of azimuth angle θ. The spectrum has main lobes at θ=0° and also at θ=+/−30°. Based on the power instantaneously received by object 14, it is therefore not possible to decide whether the object is located at 0° or +30° or at −30°. Other power maxima theoretically also result at θ=+/−90°. In practice, however, these maxima are meaningless, since an object at an azimuth angle of +/−90° is outside all transmitting lobes and receiving lobes in any case.

Figure 6:
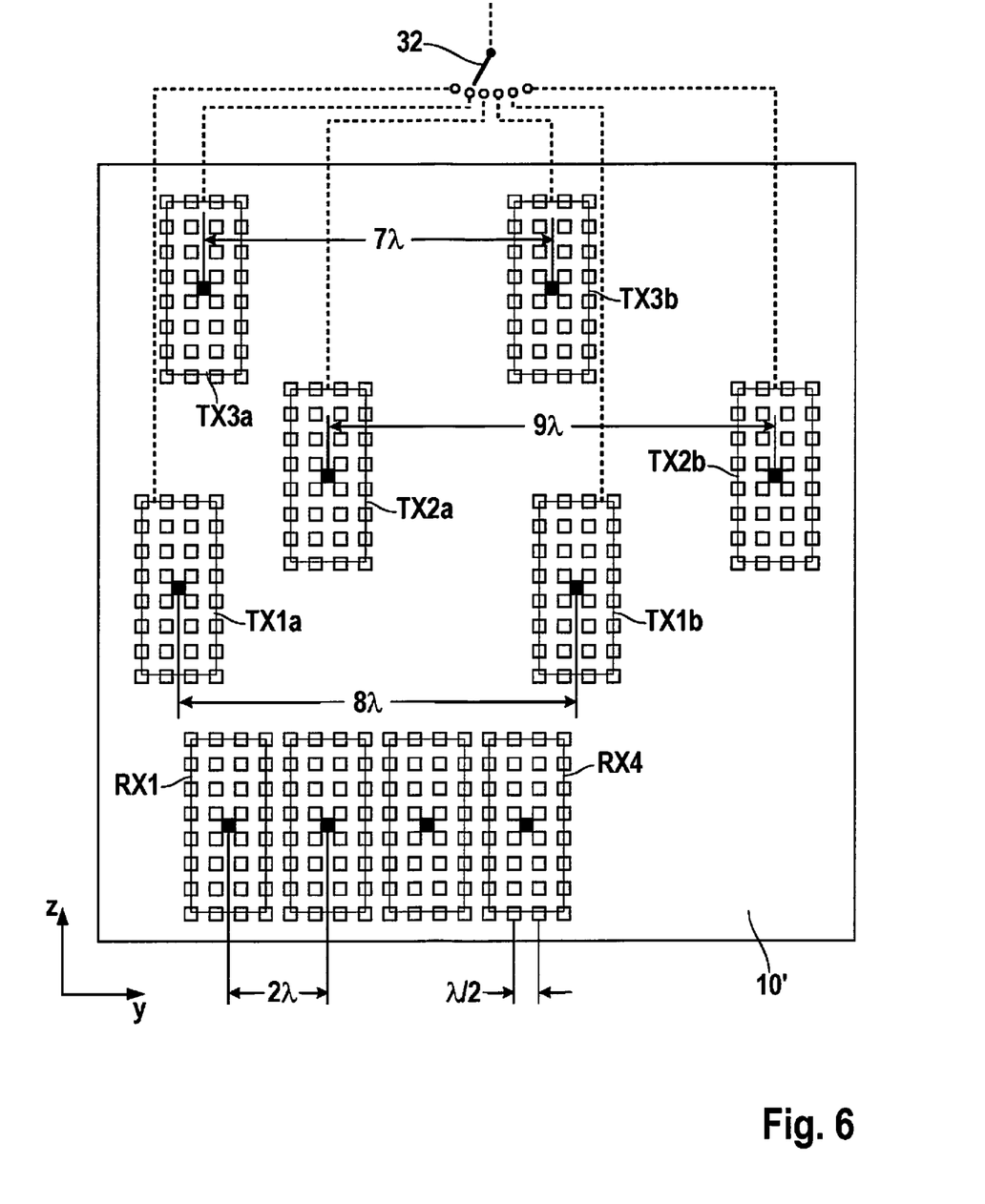
FIG. 6 shows an example of an antenna array in a radar sensor according to the present invention.

FIG. 6 shows an antenna array 10', with which it is possible, among other things, to resolve the ambiguity at +/−30°. The arrangement of the receiving antennas RX1 through RX4 corresponds to that in FIG. 4. A first pair of transmitting antennas TX1a and TX1b is situated in the same way as the transmitting antennas in FIG. 4. Two additional transmitting antennas TX2a and TX2b are situated offset relative to transmitting antennas TX1a and TX1b in z direction and form a pair with a distance of 9λ, between the phase centers. An additional pair of transmitting antennas TX3a and TX3b, in turn, is situated offset to the remaining transmitting antennas, but with a distance of only 7λ, between the phase centers.

A switch 32, which symbolizes that switching occurs periodically between the total of six transmitting antennas, is also shown in FIG. 6.

Figure 7:
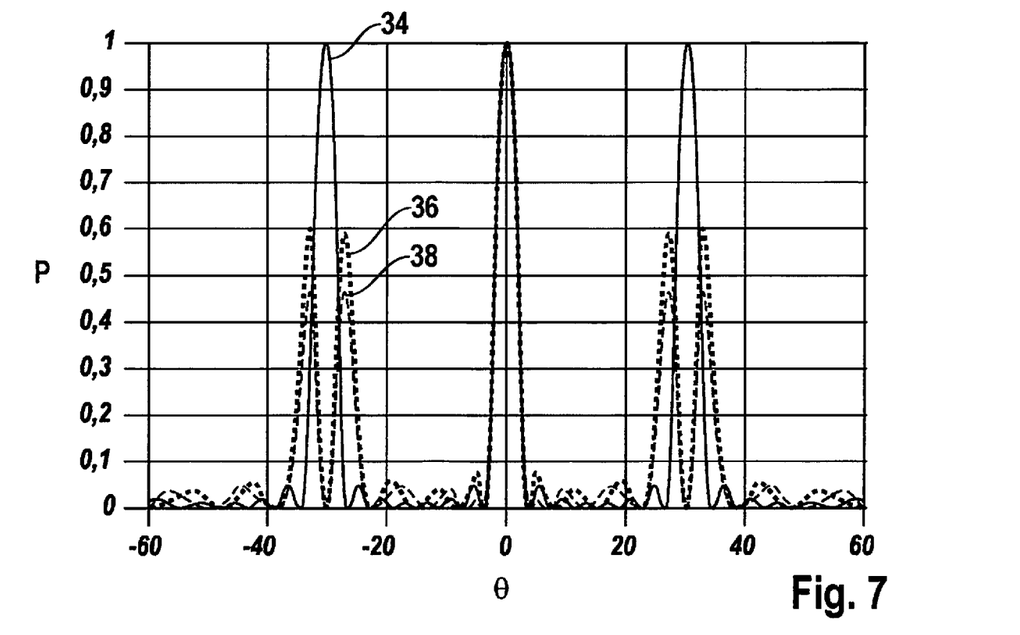
FIG. 7 shows angle spectra for three different operating modes of the antenna array according to FIG. 6.

FIG. 7 shows associated angle spectra. Curve 34 depicted in solid lines indicates the averaged power obtained when transmitting with transmitting antennas TX1a and TX1b in two different measuring cycles and then averaging the power over these measuring cycles. The spectrum is qualitatively the same as in FIG. 5. Curve 36 plotted in bold dashed lines indicates the average power for measurements with transmitting antennas TX2a and TX2b, and curve 38 plotted in thin dashed lines indicates the corresponding angle spectrum for transmitting antenna pair TX3a, TX3b. Curves 36 and 38 each have a zero at +/−30°, because in both cases the distance between the transmitting antennas is an odd multiple of λ.

Figure 8:
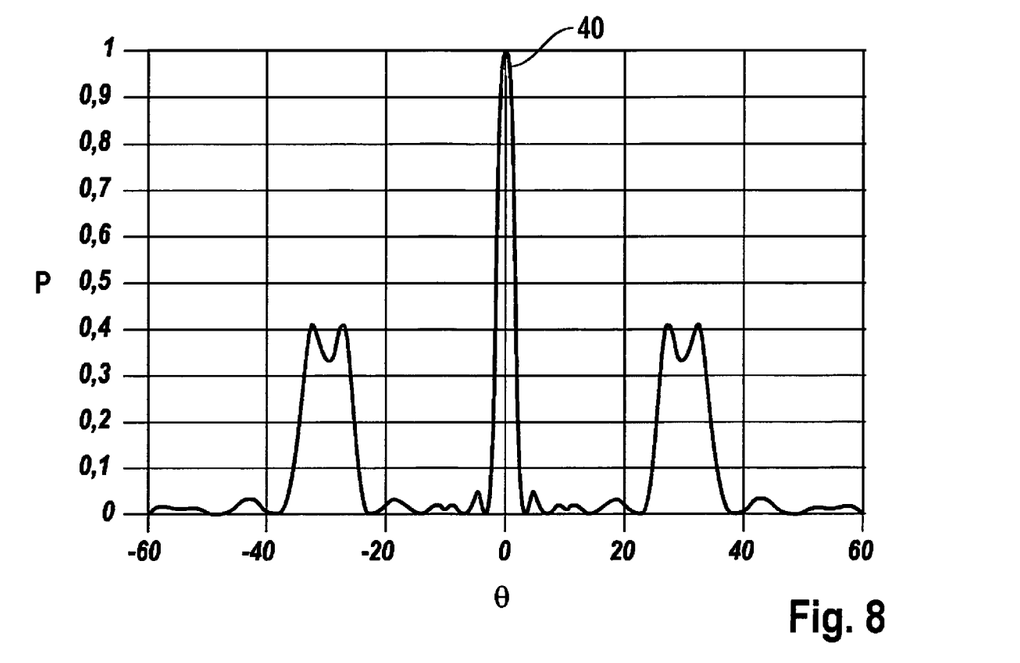
FIG. 8 shows a sum spectrum formed from the angle spectra according to FIG. 7.

Curve 40 in FIG. 8 indicates the sum spectrum obtained when the power across measuring cycles with all six transmitting antennas is added up.

With antenna array 10' according to FIG. 6, it is possible to resolve the ambiguity at +/−30°. For this purpose, the phase relationships or the phase relationships and amplitude relationships between the signals received in the four receiving channels in the various measuring cycles are generally evaluated. Azimuth angle θ may then be estimated, for example, by averaging DML functions over measuring cycles with all six transmitting antennas. However, since the overall apertures obtained with the transmitting antenna pairs TX2a, TX2b, and TX3a, TX3b differ only slightly from the aperture with antenna pair TX1a, TX1b, all other relevant properties such as, for example, the beam width and the side lobe suppression, are essentially the same as in antenna array 26 according to FIG. 3.

Another essential feature of antenna array 10' according to FIG. 6 is that the pairs of transmitting antennas are also offset from one another in the vertical, i.e. in second direction z. On the one hand, this allows the transmitting antennas to be positioned in such a way that they may also overlap in direction y (as, for example, transmitting antennas TX1b and TX3b).

However, an even more significant advantage is that an estimation of elevation angle φ with a quality value also becomes possible with this antenna array. The basic principle is based on a generalization of the connections illustrated in FIG. 4 to the three-dimensional case. The phase φi (I=1, . . . , 4) of the signal received by receiving antennas RXi is then a function not only of azimuth angle θ, but also of elevation angle φ according to the formula $$\varphi i = (2\pi/\lambda)*(y_i * \sin \theta * \cos \phi + z_i * \sin \phi)$$

In this formula, $y_i$ indicates the positions of the phase centers of the receiving antennas in direction y and $z_i$ indicates the positions of the phase centers in direction z.

A control vector $a_{rx}$ for the receiving array for characterizing the received signals may be defined as follows:

$$a_{rx,i} = \text{epx}(j\ \varphi_i)$$

In this formula, i is the index that counts the components of the control vector, and j is the complex root of −1. A corresponding control vector $a_{tx}$ may also be defined for the transmitting array formed by the transmitting antennas. This control vector then describes the phase relationships between the signals, which are emitted by the various transmitting antennas to the object in the position indicated by angles θ and φ.

The signals ultimately received by the four receiving antennas when using a particular transmitting antenna may then be characterized by the Kronecker product from the control vectors for the transmitting array and for the receiving array. Two-dimensional DML functions, which are defined on the two-dimensional θ-φ space, are then used for a two-dimensional angle estimation, with which both azimuth angle θ as well as elevation angle φ are estimated. An estimation for azimuth angle θ and elevation angle φ is then obtained, for example, by averaging the DML functions over measuring cycles with all six transmitting antennas and then finding the maximum. The azimuth angle and the elevation angle may also be estimated sequentially (first azimuth and then elevation) instead of simultaneously, which enables a reduction in computing effort.

The antenna array described herein is particularly advantageous with regard to FMCW radar sensors, which operate with so-called rapid-chirp sequences. In this case, a multitude of frequency ramps (chirps), which have a steep slope and only a relatively short duration, are passed through in rapid succession. By switching to another of the total of six transmitting antennas after each chirp, the result is that the chronological interval between the first measurement of a cycle (for example, with transmitting antenna TX1a) and the final measurement (with TX3b) is comparatively short, so that interim changes in the interval or in the relative speed of the object are negligible and the phases obtained in the successive chirps are comparable with one another (after compensating for the phase offset due to the time offset and for a potential (constant) relative speed of the object).

Figure 9:
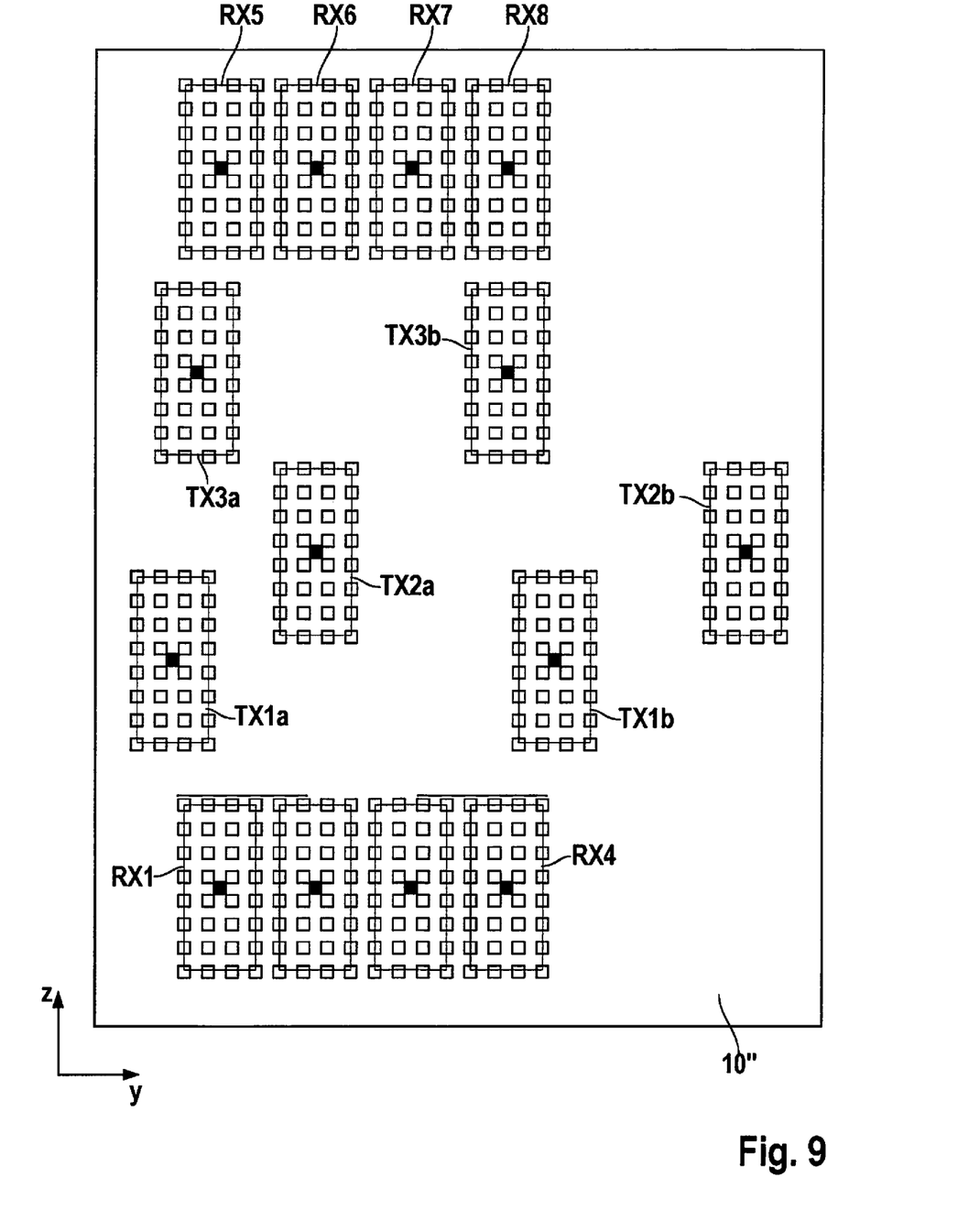
FIGS. 9 through 11 show antenna arrays in radar sensors according to modified exemplary embodiments of the present invention.

FIG. 9 shows an antenna array 10" according to another exemplary embodiment. This array differs from antenna array 10' according to FIG. 6 by an additional receiving array that includes receiving antennas RX5 through RX8, which has the same y position as the array that includes receiving antennas RX1 through RX4, but is offset in z direction, so that all of the transmitting antennas are all situated between the two receiving arrays. With this array, the aperture is increased in elevation, thus increasing the accuracy and separation capability when measuring the elevation angles.

A total of six virtual elevation planes are obtained in this array with two times four receiving antennas and two times three transmitting antennas. Thus, up to six different azimuth angles, in principle, are determinable per distance and relative speed cell (cell in the distance/relative speed space, within which different pairs of distance and relative speed may no longer be distinguished between due to the limited resolution capacity), and up to four different elevation angles are determinable per azimuth angle. In addition, the azimuth angle estimation in this array may also be redundantly designed, since it may be carried out either with receiving antennas RX1 through RX4 or with receiving antennas RX5 through RX8. If an additional transmitting antenna pair were to be added, the antennas of which, such as TX1a and TX1b, are at a distance 8π, to one another, then the system could be redundantly designed also with respect to the transmitting antennas.

On the other hand, an antenna array is also possible, as is shown in FIG. 1, that includes only three transmitting antennas and four (optionally eight) receiving antennas. Transmitting antenna TX1 in this case is offset from receiving antenna RX1 in y direction again by 1λ, and the offset of transmitting antennas TX2 and TX3 from TX1 is 3λ, respectively 1λ.

This array also allows for a resolution of the ambiguity between azimuth angles 0° and 30° in most scenarios (for 4 receiving antennas and 3 elevation planes for not more than two targets in a distance and relative speed cell). A "false" azimuth hypothesis (for example, 30° instead of 0° results in this case in a phase error of 180° in the elevation angle estimation, and thus in a poor elevation angle quality. In the case of the elevation angle estimation, coherent integration takes place via the signals of the four receiving antennas, so that the signal-to-noise ratio SNR is four times higher than in a single channel. As a result, the decision regarding the correct azimuth hypothesis may be made with great certainty.

It is not possible, however, with antenna array 10 in FIG. 1 to distinguish between azimuth angles +30° and −30°. The angle evaluation range in long-range radar sensors, however, is already usually limited to +/−15°, so that this limitation may be accepted.

Furthermore, the exemplary embodiment according to FIG. 1 (as well as the other exemplary embodiments) may be modified to the extent that at least two of the transmitting antennas have an offset in the y direction, which is a non-integer multiple of λ. The ambiguity between +30° and −30° may be resolved in this way as well.

With the previously described antenna arrays, a multiple target estimation is also possible in the azimuth, since a multitude of different measuring configurations may be implemented with the at least four receiving antennas and the at least three transmitting antennas which, of course, are also offset in the y direction. There is a complication when estimating elevation angle φ, insofar as the phase relationship between the signals received with various transmitting antenna pairs is also a function of the azimuth angle of the targets. Hence, the advantageous way to proceed is to initially carry out the azimuth angle estimation and to then determine the complex signal components of the individual (azimuth) targets with the aid of the pseudo inverses for each elevation plane. Based on this, a single target or multiple target estimation in elevation for each azimuth target may subsequently be carried out.

Of the previously presented antenna arrays, 10″ already permits a multiple target estimation in elevation, however, with the disadvantage that the different azimuth ambiguities of the elevation planes (due to different horizontal distances of the transmitting antenna pairs) may negatively influence the elevation estimation (depending on the position of the targets in azimuth).

Figure 10:
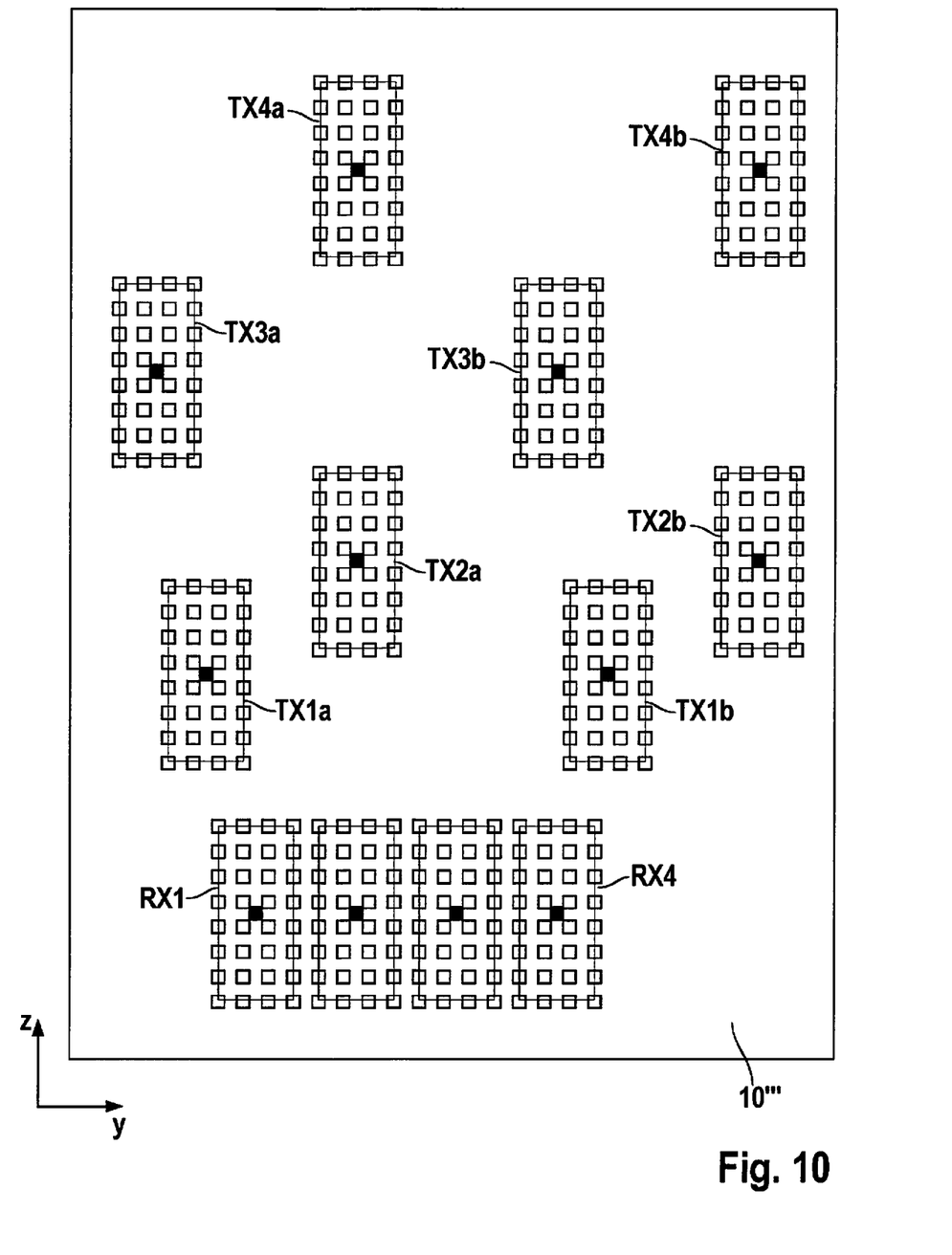

FIG. 10 shows an antenna array 10‴, with which a multiple target estimation in elevation is possible without this disadvantage. In this array, the transmitting antennas of each pair are at the same distance from one another (in this example, 8λ). Moreover, the antenna array in this example includes an additional pair of transmitting antennas TX4a, TX4b, so that a total of four transmitting antenna pairs are available, which are all offset from one another in the z direction. Because of the horizontal offset of the pairs, it is possible to reduce the vertical offset to the point that the transmitting antennas overlap one another in z direction (as, for example, the transmitting antennas TX1a and TX2a). With the four pairs of transmitting antennas, which have different offsets in z direction relative to receiving antennas RX1 through RX4, it is possible to carry out four separate measurements, which enable a multiple target estimation in elevation with up to two targets.

Figure 11:
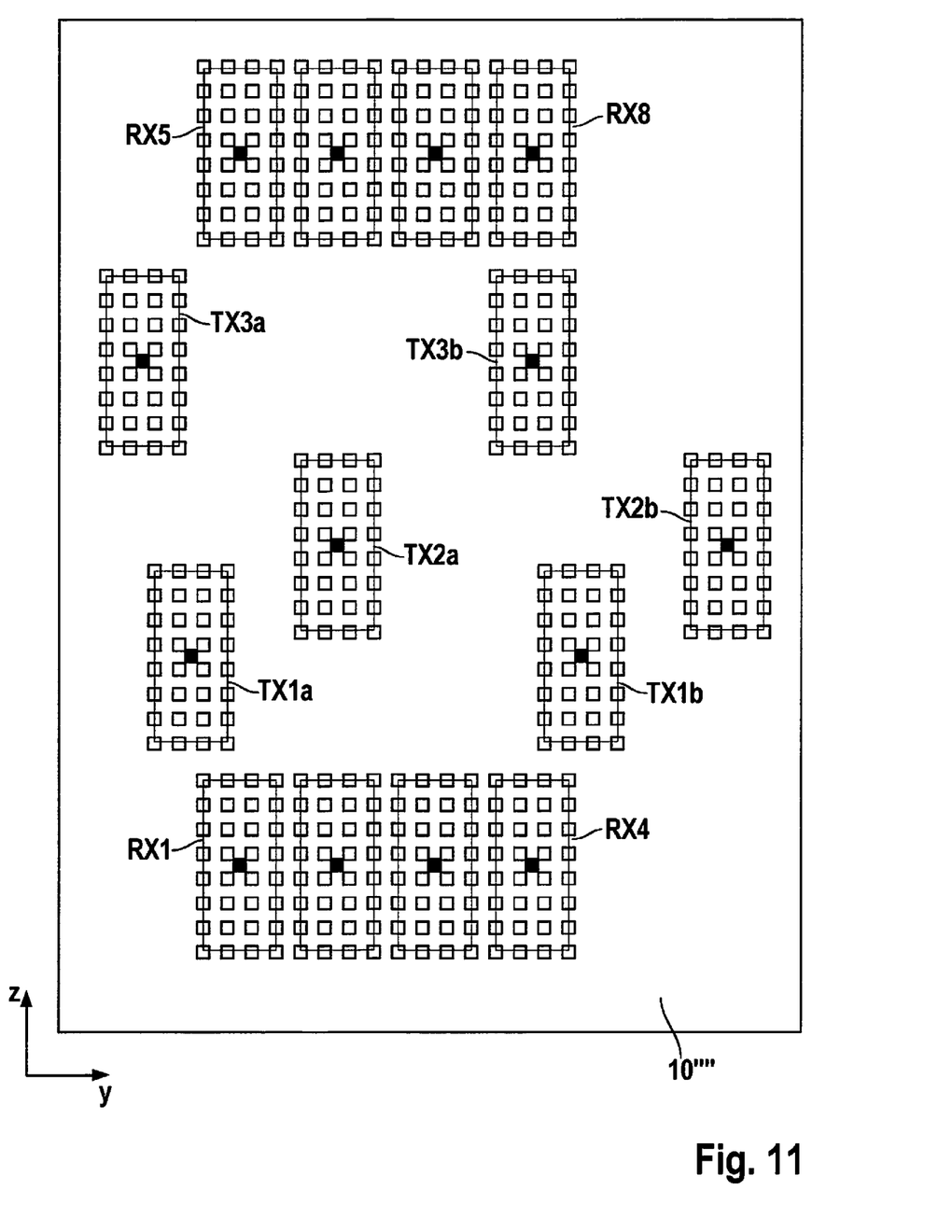

FIG. 11 shows another antenna array 10″″ that includes two receiving antenna arrays (RX1 through RX4, RX5 through RX8) and 3 (or optionally 4) transmitting antenna pairs. Similar to FIG. 10, the two antennas in all pairs are at the same distance from one another. In principle, up to six different azimuth angles per distance and relative speed cell are determinable with this antenna array, and up to four different elevation angles per azimuth angle are determinable. However, the above described disadvantage of antenna array 10″ does not exist.

The exemplary embodiments described above operate using a bi-static antenna concept. Optionally, however, a mono-static antenna concept could also be used, in which the same (group) antennas are utilized for transmitting and for receiving.

The transmitting antennas in the example described herein are also operated in time multiplex. Alternatively, however, a frequency method or code multiplex method could also be used.

What is claimed is:

1. A MIMO radar sensor for a motor vehicle, comprising:
   an antenna array that is angle-resolving in a first direction and in a second direction perpendicular to the first direction, wherein the antenna array includes:
     multiple receiving antennas that are situated offset to one another in the first direction, and
     multiple transmitting antennas;
   a control and evaluation unit for activating the transmitting antennas and for evaluating signals of the receiving antennas, wherein:
   at least three antennas in the antenna array are selectively activatable transmitting antennas, each of the at least three antennas being offset from each of at least two other antennas of the at least three antennas in the first direction and in the second direction, and
   the control and evaluation unit performs a two-dimensional angle estimation in the first direction and in the second direction using the signals received when the transmitting antennas are activated differently.

2. The radar sensor as recited in claim 1, wherein:
   the receiving antennas include at least four receiving antennas, and
   the at least four receiving antennas are situated at uniform distances on a straight line extending in the first direction.

3. The radar sensor as recited in claim 1, wherein:
   a distance between two adjacent receiving antennas each is greater than λ2,
   λ, is a wavelength of the radar waves, and
   the control and evaluation unit carries out an angle estimation in the first direction according to a MIMO principle by activating different ones of the transmitting antennas.

4. The radar sensor as recited in claim 3, wherein at least two of the transmitting antennas exhibit an offset to one another in the first direction that is smaller than an offset between the two adjacent ones of the receiving antennas.

5. The radar sensor as recited in claim 1, wherein the antenna array includes at least two pairs of transmitting antennas that are at different distances to one another from pair to pair in the first direction and are at a same height in the second direction.

6. The radar sensor as recited in claim 1, wherein the antenna array includes multiple pairs of the transmitting antennas that are offset from one another in the second direction and in which the two antennas in all the pairs are at a same distance from one another in the first direction.

7. The radar sensor as recited in claim 1, wherein the antenna array includes at least two groups of the receiving antennas that have a same position in the first direction and are offset from one another in the second direction.

8. The radar sensor as recited in claim 1, wherein the antenna array includes at least four of the transmitting antennas that are offset from one another in the second direction, and in which the control and evaluation unit carries out a multiple target angle evaluation in the second direction.

9. The radar sensor as recited in claim 1, wherein at least one of the transmitting antennas and the receiving antennas are group antennas.

10. The radar sensor as recited in claim 9, wherein at least two of the transmitting antennas are offset from one another in the first direction and overlap one another in the second direction.

11. The radar sensor as recited in claim 9, wherein at least two of the transmitting antennas are offset from one another in the second direction and overlap one another in the first direction.

12. The radar sensor as recited in claim 1, wherein each of the multiple receiving antennas and each of the multiple transmitting antennas is a group antenna including a matrix of antenna patches situated on a shared planar substrate.

13. The radar sensor as recited in claim 12, wherein each of matrices includes 32 patches.

* * * * *